US008851373B2

(12) United States Patent
MacKenzie et al.

(10) Patent No.: US 8,851,373 B2

(45) Date of Patent: Oct. 7, 2014

(54) TRACKING INFORMATION IN A NOTE HANDLING FACILITY

(75) Inventors: Bob MacKenzie, West Chester, PA (US); Thomas E. Shuren, West Chester, PA (US); Neil M. Young, Downingtown, PA (US)

(73) Assignee: MEI, Inc., Malvern, PA (US)

( * ) Notice: Subject to any disclaimer, the term of this patent is extended or adjusted under 35 U.S.C. 154(b) by 1069 days.

(21) Appl. No.: 11/762,536

(22) Filed: Jun. 13, 2007

(65) Prior Publication Data

US 2008/0011840 A1 Jan. 17, 2008

Related U.S. Application Data

(60) Provisional application No. 60/813,863, filed on Jun. 14, 2006.

(51) Int. Cl.

*G06F 7/08* (2006.01)
*G07D 11/00* (2006.01)
*G07G 1/00* (2006.01)
*G07F 7/04* (2006.01)

(52) U.S. Cl.

CPC ............ *G07D 11/0066* (2013.01); *G07G 1/009* (2013.01); *G07F 7/04* (2013.01)
USPC .......................................................... 235/381

(58) Field of Classification Search

USPC .......................................................... 235/381
See application file for complete search history.

(56) References Cited

U.S. PATENT DOCUMENTS 4,992,648 A 2/1991 Hutchinson
5,630,755 A 5/1997 Walsh et al.
5,640,002 A * 6/1997 Ruppert et al. .......... 235/462.46
5,774,876 A 6/1998 Wooley et al.
6,332,099 B1 * 12/2001 Heidel et al. .................. 700/231
6,633,881 B2 * 10/2003 Drobish et al. ........................ 1/1
6,845,905 B2 * 1/2005 Blad et al. ..................... 235/375
6,896,116 B2 5/2005 Deaville et al.
6,941,274 B1 * 9/2005 Ramachandran et al. . 705/26.35
RE39,666 E 5/2007 Walsh et al.
7,275,991 B2 * 10/2007 Burns et al. ...................... 463/25
7,494,414 B2 * 2/2009 Hedrick et al. ................. 463/20
2002/0091648 A1 * 7/2002 Phillips et al. .................. 705/71
2003/0189093 A1 * 10/2003 Fujimoto ...................... 235/382
2003/0230464 A1 * 12/2003 Deaville et al. ............... 194/302
2004/0016797 A1 * 1/2004 Jones et al. ................... 235/379
2004/0149817 A1 8/2004 Kuroiwa et al.

(Continued)

FOREIGN PATENT DOCUMENTS

| | | |
|---|---|---|
| JP | S61-229185 | 10/1986 |
| WO | 01/91065 | 11/2001 |
| WO | 2005/055159 | 6/2005 |

*Primary Examiner* — Daniel A Hess

*Assistant Examiner* — David Tardif

(74) *Attorney, Agent, or Firm* — Mintz Levin Cohn Ferris Glovsky and Popeo, P.C.

(57) ABSTRACT

Tracking information in a note handling facility, such as an amusement gaming facility, involves, in some implementations, communications between components of the system to facilitate tracking the location and movement of note acceptors and cassettes for storing notes. Such components can include host machines, note acceptors, cassettes for storing notes, databases, and/or note counting machines. RF tag chips can be embedded in or mounted to some of the components to facilitate the communications. RF tag readers can be provided at appropriate locations within the facility to facilitate reading information from and writing information to the RF tag chips.

6 Claims, 11 Drawing Sheets

(56) References Cited

U.S. PATENT DOCUMENTS

| | | | | |
|---|---|---|---|---|
| 2004/0169075 | A1* | 9/2004 | Washington et al. | 235/379 |
| 2004/0180721 | A1* | 9/2004 | Rowe | 463/42 |
| 2004/0238319 | A1 | 12/2004 | Hand et al. | |
| 2007/0194106 | A1* | 8/2007 | Force et al. | 235/379 |
| 2008/0200256 | A1* | 8/2008 | Gagner et al. | 463/42 |
| 2008/0223930 | A1* | 9/2008 | Rolland et al. | 235/385 |

* cited by examiner

TRACKING INFORMATION IN A NOTE HANDLING FACILITY

CROSS REFERENCE TO RELATED APPLICATION(S)

This application claims priority from U.S. Provisional Patent Application No. 60/813,863, filed on Jun. 14, 2006.

BACKGROUND

In the currency handling industry, it is important to be able to monitor and track currency, such as banknotes and similar documents of value. Notes often are stored in a cash box, which sometimes may be referred to as a currency cassette. Depending on the context in which the cash box is being used, the cash box may be securely located in, or attached to, for example, a safe, a gaming machine, a vending machine or a change machine. The locked cash box typically is removable from the safe or the machine by authorized service personnel so that the cash box can be transported to a secure, central location where the cash is removed and counted. Part of monitoring and tracking the currency, for example, in a gaming facility (e.g., a casino) may include tracking the location and movement of the cash boxes, as well as tracking note acceptors that determine whether currency inserted into the machine is genuine.

SUMMARY

This disclosure relates to tracking information in a note handling facility.

Tracking information in a note handling facility involves, in some implementations, communications between components of the system to facilitate tracking the location and movement of note acceptors and cassettes for storing notes. Such components can include host machines (e.g., gaming or vending machines), note acceptors, cassettes for storing notes, databases, and/or note counting machines.

In some implementations, radio frequency ("RF") tag chips are embedded in or mounted to various of the components to facilitate the communications. RF tag readers can be provided at appropriate locations within the facility to facilitate reading information from and writing information to the RF tag chips.

As used herein, the term "note" (or "notes") includes, but is not limited to, paper currency such as banknotes, bills, security documents, paper currency checks, coupons, tickets and other documents of value that may be used as legal tender in exchange for goods or services.

Various aspects of the invention are defined by the claims.

In one aspect, a disclosed method includes scanning identification information from a label on a host machine, transferring the scanned identification information to a note acceptor coupled to the host machine, and storing the transferred identification information in memory associated with the note acceptor.

In some implementations, the identification information on the label includes bar-coded identification information. A hand-held bar-code reading device can be used to scan the identification information from the label and transfer it to the note acceptor.

In a second aspect, a method for a host machine (e.g., a gaming machine or vending machine), with a note acceptor coupled the host machine, includes interrogating the note acceptor for identification information stored in memory associated with the note acceptor and receiving identification information from the note acceptor. The host machine is operated in a manner dependent on whether or not the identification information from the note acceptor matches identification information stored by the host machine.

In some implementations, if the identification information from the note acceptor does not match the identification information stored by the host machine, the host machine reports occurrence of an error. Also, in some implementations, if the identification information from the note acceptor does not match the identification information stored by the host machine, the host machine updates the identification information in the note acceptor.

In a related aspect, a method includes installing a note acceptor in a host machine, transferring identification information from the host machine to memory associated with the note acceptor, and storing the identification information in the note acceptor memory. In some implementations, the identification information transferred from the host machine is permanently programmed into host machine memory. The identification information can be transferred to the note acceptor memory, for example, upon power up of the note acceptor.

A third aspect relates to a method for a note acceptor installed in a currency handling system that includes a host machine and a cassette for storing notes received by the note acceptor. The method includes communicating with the cassette to request that the cassette provide identification information if predetermined identification information is stored in memory associated with the note acceptor. Identification information is received from the cassette, and the identification information received from the cassette is stored in the memory associated with the note acceptor. In some implementations, the predetermined identification information stored in the memory associated with the note acceptor indicates that the note acceptor is a replacement or spare note acceptor.

In a related aspect, a note acceptor includes a micro-processor and memory, and is operable, upon being powered up, to communicate with a cassette coupled to the note acceptor to request that the cassette provide identification information, if the note acceptor previously determines that predetermined identification information is stored in the memory. The note acceptor further is operable to receive identification information from the cassette and to store the identification information received from the cassette in the memory.

According to a fourth aspect, a method of processing a cassette for storing notes includes removing the cassette from a first location where it is coupled to a note acceptor that is coupled to a host machine, placing the cassette on a RF tag reader station, and using a RF tag reader to read contents of a RF tag chip mounted to the cassette while the cassette is on the RF tag reader station. In some implementations, the method includes opening the cassette and removing notes from the cassette while the cassette is on the RF tag reader station, and using the RF tag reader to mark the RF tag chip electronically with an indication that the cassette has been emptied. A copy of the contents read from the RF tag chip can be printed.

A fifth aspect relates to a method for a note acceptor to operate with a newly installed cassette for receiving notes. The method includes checking the contents of memory associated with the newly installed cassette, and operating the note acceptor in a manner dependent on whether the contents of the cassette memory indicate that the cassette is empty. In some implementations, the method includes operating the note acceptor in a manner dependent on at least one of whether the contents of the cassette memory indicate that the cassette is empty and whether identification information in the cassette memory matches identification information stored in memory associated with the note acceptor. The note acceptor can be inhibited from accepting notes if the contents of the cassette memory indicate that the cassette is not empty and if the identification information in the cassette memory does not match the identification information stored in the memory associated with the note acceptor.

According to a sixth aspect, a method includes communicating information indicative of a software version with which a note acceptor is configured, the information being communicated from the note acceptor to a cassette for storing notes. The information is stored in memory associated with the cassette. Subsequently, the information is read from the memory associated with the cassette. In some implementations, the method includes storing the information read from the memory associated with the cassette in a database. The method can include interrogating the database to check what version of software is being used by the note acceptor and confirming that the version of software being used by the note acceptor matches an expected version.

In a seventh aspect, a method for processing information in a first RF tag chip mounted to a cassette for storing notes includes placing the cassette in the vicinity of a RF tag reader and placing a card in the vicinity of the RF tag reader, wherein the card has a second RF tag chip embedded therein or mounted thereto. The information in the first RF tag chip is transferred to the second RF tag chip via the RF tag reader. A stack of notes is removed from the cassette, and the card is transported together with the stack of notes after transferring the information to the second RF tag chip. The notes are fed into a note counting machine, and the information is transferred from the second RF tag chip to the note counting machine. In some implementations, prior to placing the cassette in the vicinity of the RF tag reader, the cassette is detached from a host machine where the cassette stores notes received from a note acceptor and where the first RF tag chip mounted to the cassette stores information received from the note acceptor.

Other aspects, features and various advantages that are present in some implementations will be apparent from the following detailed description, the accompanying drawings, and the claims.

DETAILED DESCRIPTION

Figure 1:
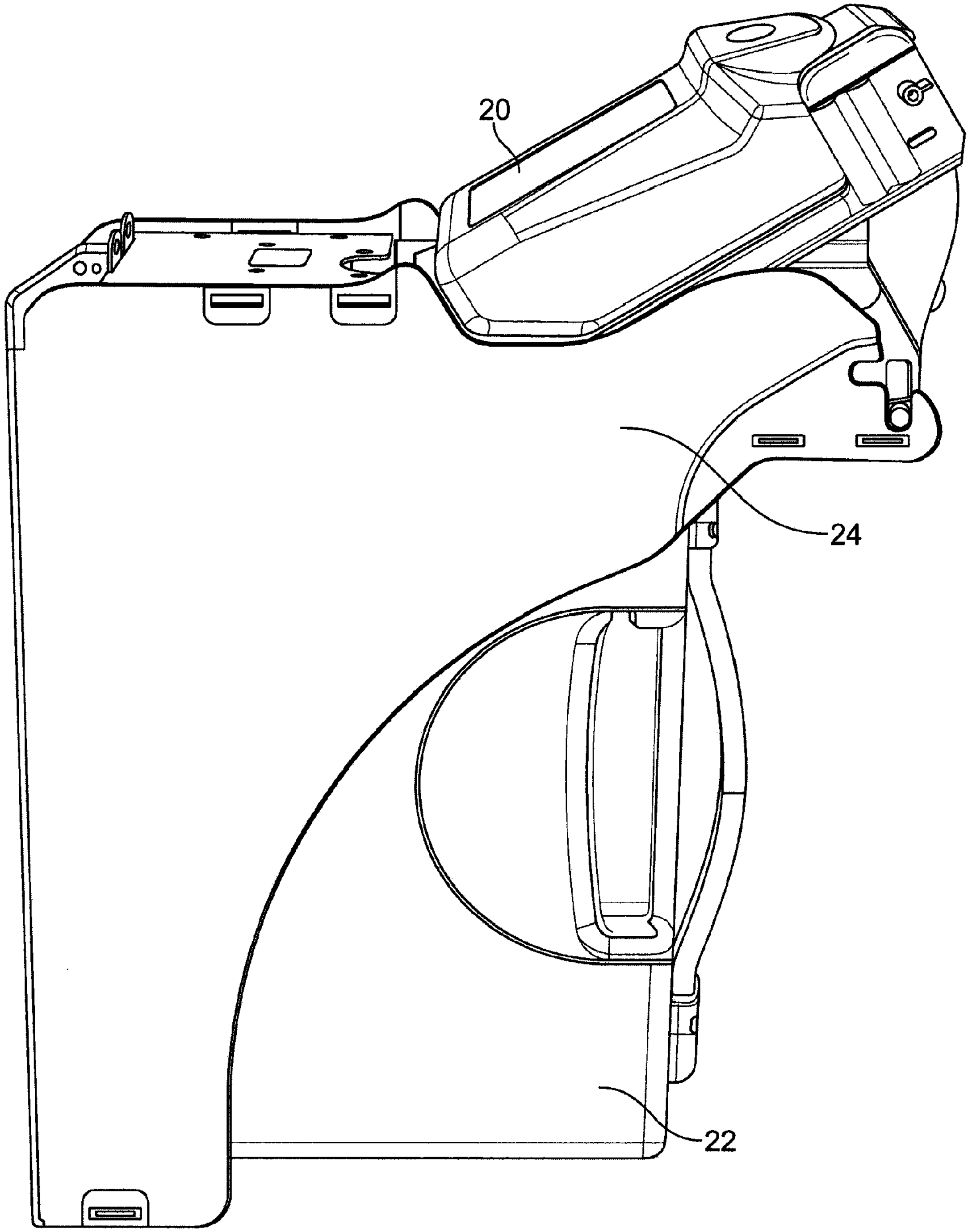
FIG. 1 illustrates a side view of an example of a currency handling system.
Figure 2:
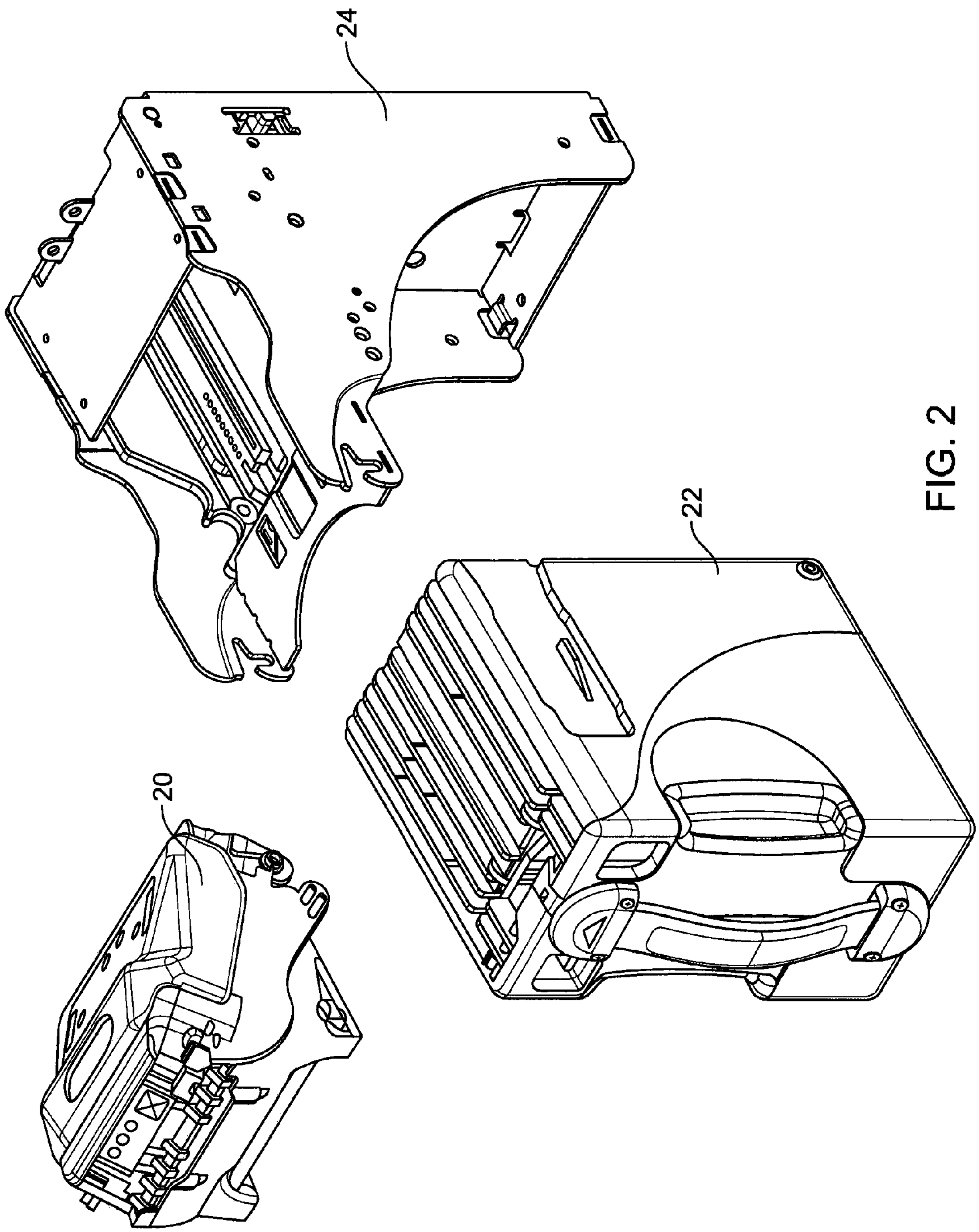
FIG. 2 illustrates an exploded view of a currency handling system.

As illustrated in the example of FIGS. 1 and 2, the currency handling system includes a micro-processor-based note acceptor 20 (e.g., a MEI CASHFLOW® SC Series acceptor) to receive banknotes or other documents of value (e.g., coupons). In the illustrated example, the note acceptor 20 is operable to check the authenticity of the inserted note and, if authentic, to determine its denomination. Notes that are accepted (e.g., validated as being genuine) are transported to a cash box 22 (sometimes referred to as currency cassette), where they are stored in a secure manner until the cash box is removed by authorized personnel. Notes that are not accepted (e.g., not validated as being genuine) can be returned. Both the acceptor 20 and the cash box 22 are removably attached to a chassis (i.e., a frame) 24.

Figure 3:
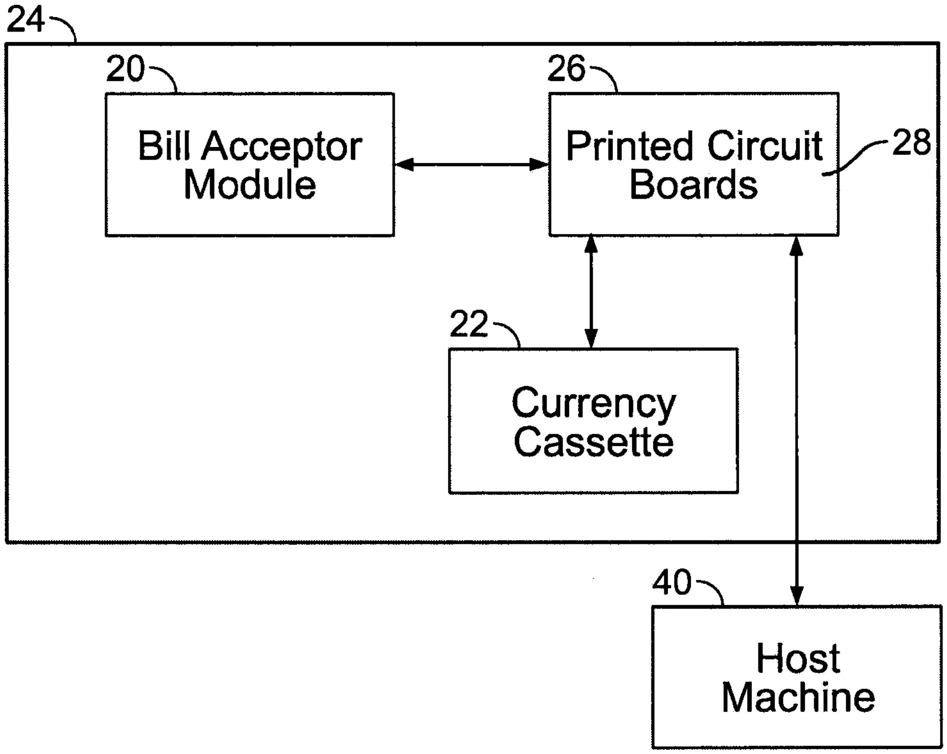
FIG. 3 is a block diagram of a currency handling system.

As shown in FIG. 3, the acceptor 20 is coupled to a host machine such as a gaming machine (e.g., a slot machine) 40. Other than the opening (e.g., slot) in the front of the acceptor 20 through which notes are inserted, unauthorized personnel do not have access to the chassis 24, the cash box 22 and the remainder of the acceptor 20. Those components can be hidden, for example, behind a locked door such that they are accessible only to authorized personnel. In other implementations, the note acceptor 20 is coupled to a vending machine, change machine or other host machine.

In the illustrated example, the acceptor 20 has a RF antenna associated with it to transmit and receive data. As shown in FIG. 4A, an interface printed circuit board ("PCB") 26 is attached to the chassis 24 and is positioned between the location for the acceptor 20 and the cash box 22. The interface board 26 includes circuitry to control various aspects of the acceptor 20. An antenna PCB 28 (see FIG. 3) is positioned below the interface PCB 26 and has circuitry that includes a small antenna for transmitting and receiving radio frequency ("RF") signals. As discussed below, the antenna board 28 allows the note acceptor 20 to communicate with the cash box 22. An interface connector 27, for example, allows the note acceptor 20 and host machine to communicate through the interface board 26.

Figure 4B:
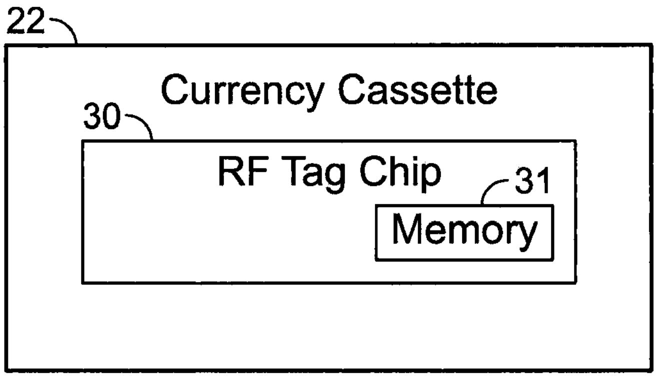
FIG. 4B is a block diagram of an example of a cash box.
Figure 4A:
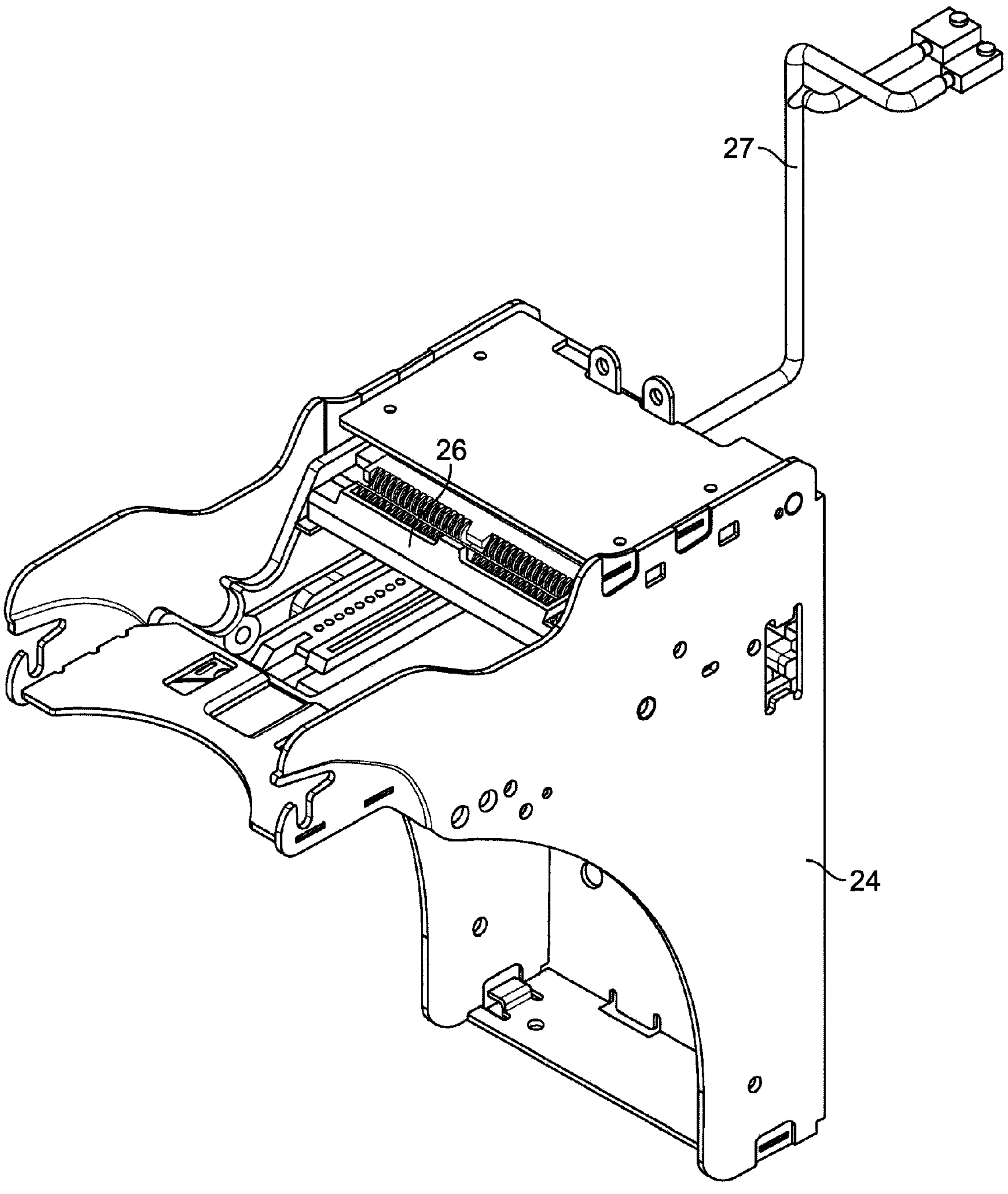
FIG. 4A illustrates a printed circuit board mounted in a frame.

As indicated by FIG. 4B, a RF tag chip 30 is mounted to a surface of the cash box 22 that is adjacent the antenna board 28 when the cash box is installed in the chassis 24. The RF tag chip 30 can take the form, for example, of a small, circular tag having an adhesive on one of its surfaces to facilitate mounting on the cash box. The RF tag chip 30 includes memory 31, and data can be written to and read from the RF tag 30 on the cash box 22.

For example, once the cash box 22 is installed in a chassis 24 with an associated note acceptor 20 having an interface board 26 with a fixed antenna, data can be written to the cash box memory 31. With the RF tag 30 in close proximity to the note acceptor 20, modulation of the acceptor's antenna energizes an antenna in the RF tag that allows data to be communicated to the RF tag chip 30 and transferred to the RF tag's memory 31.

Although the illustrated implementation uses a RF tag chip 30 to facilitate radio frequency communications between the cash box 22 and the note acceptor 20, in other implementations, the cash box and acceptor can communicate through other means, such as electrical or optical communications.

Various types of data that can be transferred from the note acceptor 20 for storage in the cash box memory include product performance and audit data. Such data may contain information such as, but not limited to, operating hours, number of notes processed, tamper attempts detected, number of notes and how they were inserted, number of jams and jam recoveries, acceptance rates, number of resets, and the number of times the cash box became full. Other information also can be stored in the RF tag memory.

For example, it can be advantageous to store information indicative not only of the total number of notes and the number of notes for each denomination, but also the number of notes within a particular series for each denomination. For example, U.S. $5 bills have multiple series. The bills of each series are generally accepted as currency in the U.S., and various note acceptors can differentiate among the different series of bills by detecting differences in their optical or other characteristics. Thus, the note acceptor can communicate to the cash box memory the number of bills in each particular series.

Another example of the type of data that can be transferred from the note acceptor 20 for storage in the cash box memory 31 is identification information (e.g., a location number or asset number). Preferably, the identification information includes a unique identifier associated with the host machine. This facilitates tracking and monitoring of the movement of each cash box in the gaming or other facility so that currency stored in each cash box can be tracked and monitored more easily. The movement of the note acceptors also can be tracked and monitored in this way.

The identification number (e.g., the location number or asset number) can be provided to the note acceptor 20 in any one of various ways. In some implementations, the location or asset number is entered into the note acceptor using a computer (e.g., laptop) or a handheld device coupled to the note acceptor. The location or asset number can be entered via the computer or handheld device using, for example, a keyboard, swipe device, memory stick or other data entry device. For example, the asset number can be provided to the bill acceptor by connecting a personal computer or handheld device to a USB port on the front of the bill acceptor. In other implementations, a Universal Serial Bus-based ("USB-based") scanner is coupled directly to the note acceptor to read identification from the host machine and report it directly to the note acceptor.

Alternatively, a hand-held bar-code wand attached, for example, near the front of the host machine and coupled to the note acceptor can be used to scan unique identification information (e.g., a location or asset number) encoded as a bar code on a label mounted to the gaming or other machine. The location or asset number then is written from the bar code wand to the note acceptor memory. When the cash box 22 is installed in the chassis 24, the unique location or asset number is transmitted from the note acceptor 20 to the cash box memory 31.

Figure 5:
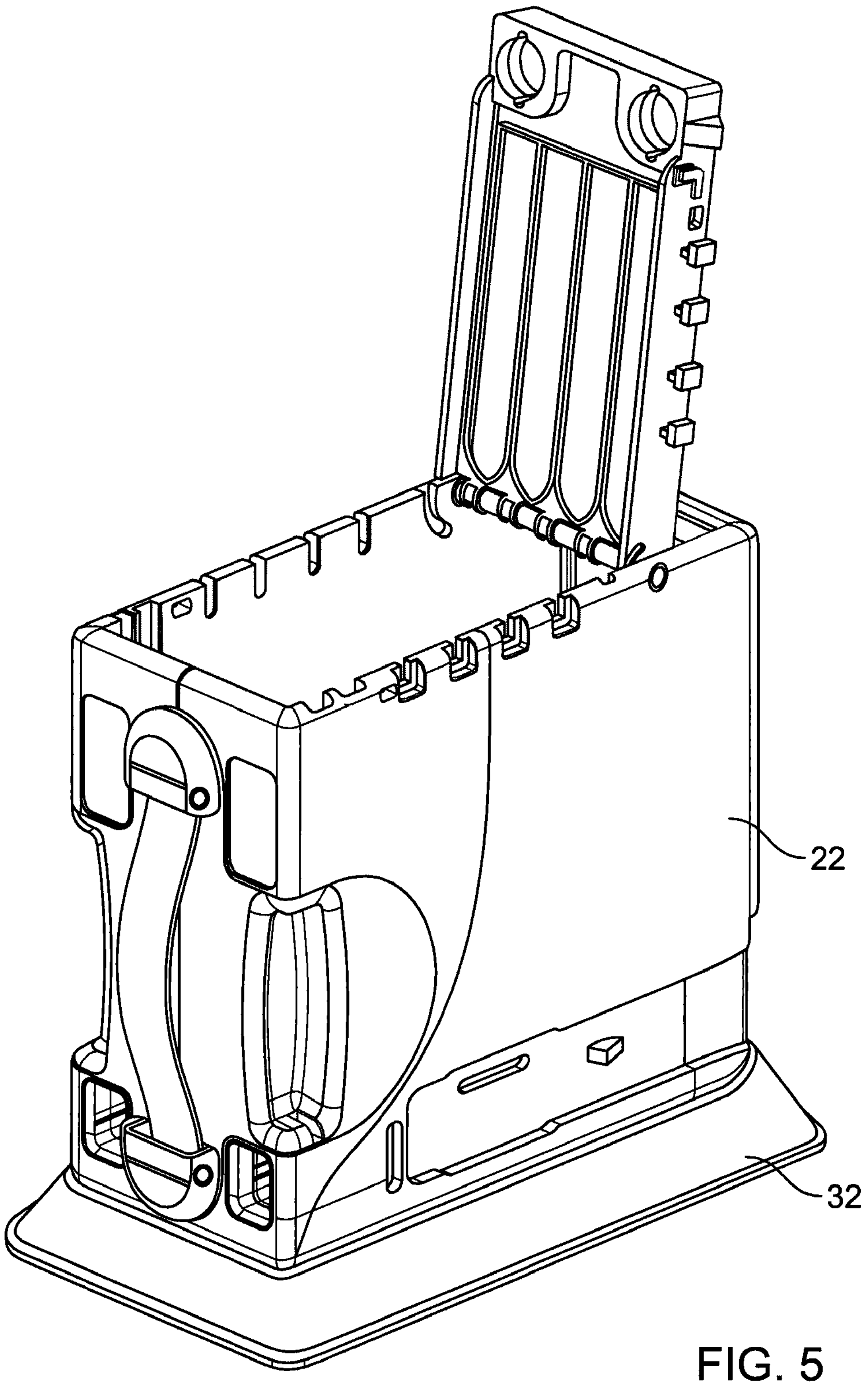
FIG. 5 illustrates a cash box mounted in a RF tag reader station.
Figure 6:
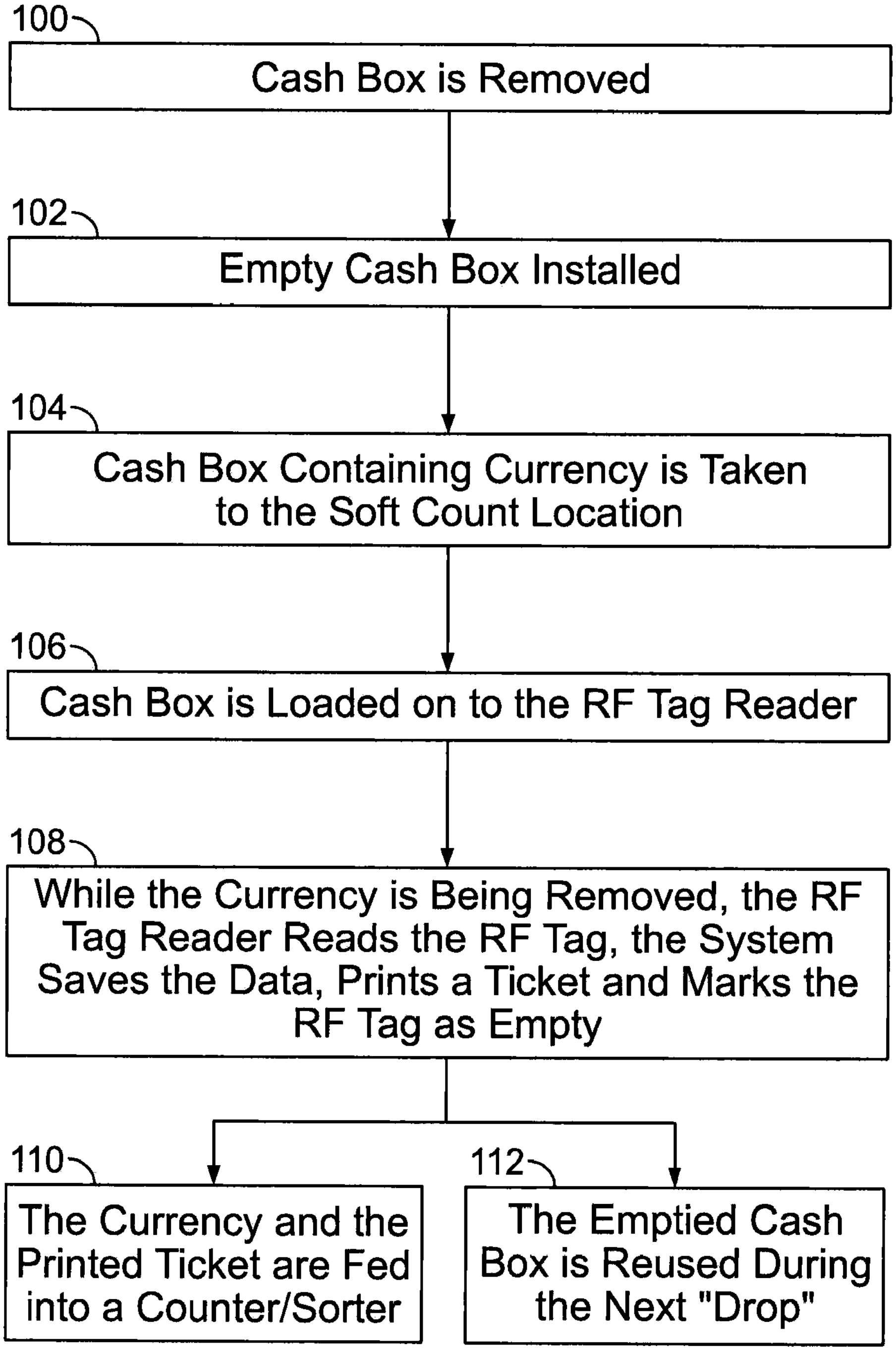
FIG. 6 is a flow chart.

Data also can be read from the cash box memory 31. For example, if the cash box memory 31 is part of a RF tag chip 30, the data can be read by a RF tag reader having an antenna. In the context of a gaming facility, the RF tag reader can be located, for example, in a soft count room where the contents of the cash box 22 are verified. In a particular scenario (see FIG. 6), authorized personnel would remove the cash box 22 from the chassis 24 (block 100), replace an empty cash box in the chassis (block 102), and take the locked cash box 22 to a secure soft count room (block 104). As indicated by block 106, the cash box 22 then is placed on a RF tag reader station 32 (see FIG. 5) on whose upper surface is mounted a RF tag reader. The RF tag reader reads the data previously stored in the cash box memory 31 (block 108). A printer (not shown) can be coupled to the RF tag reader station 32 so as to receive the data read from the RF tag 30. The printer is operable to generate a ticket with the data from the RF tag printed thereon. Also, the RF tag reader marks the RF tag chip memory 31 electronically to indicate the cash box 22 is empty. At the same time, authorized personnel can unlock and open the currency access door 34 of the cash box 22 to remove the currency stored therein. As indicated by block 110, the authorized personnel can feed the currency removed from the acceptor 20 and the printed ticket into a sorter or counter. The emptied cash box can be reused for a subsequent "drop" (i.e., for subsequent replacement of another cash box that is removed from a gaming or other host machine).

The information read by the RF tag reader from the cash box memory 31 can be stored, for example, in a database. The stored information can be used to generate reports to assist management in monitoring and tracking various activities taking place at the gaming or other facility. For example, the gaming facility may determine that there appears to be potentially fraudulent activity with respect to the use of a particular series of bills. In such a situation, management personnel may choose to reconfigure (e.g., change the software in) the note acceptors used at the gaming facility so as not to accept notes of the specified series.

In some currency counting applications, it is desirable to have the currency sorting and counting equipment located in a different area from where the notes are removed from the cash box. In such situations, the information contained within the cash box memory 31 should be physically transported together with the notes so that the information remains available when the notes are counted. The following paragraphs describe a technique to copy stored data from the cash box memory to a RF tag attached to a card, which then is transported with the notes from the location where the notes are removed from the cash box to the location where the notes are counted.

Figure 7:
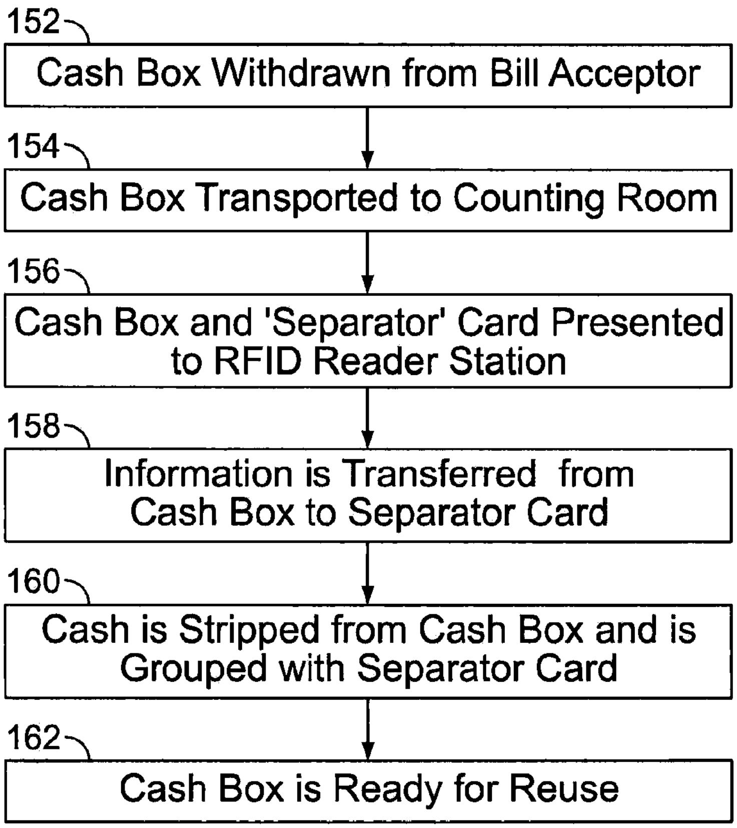
FIG. 7 is a flow chart.
Figure 8:
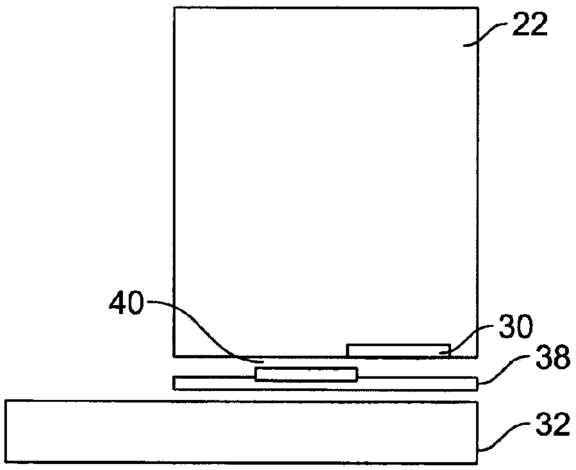
FIG. 8 is a schematic block diagram of a cash box mounted for reading at a RF tag reader station.

As shown by FIG. 7, after a cash box 22 is detached from a note acceptor 20 on the gaming floor (block 152) and transported to the counting room (block 154), the cash box and a "separator" card 38 are placed in the vicinity of the RF tag reader station 32 (block 156). As illustrated in FIG. 8, the separator card 38 can be, for example, a plastic card slightly larger than the size of the notes and can be used to separate one stack of notes from another when they are transported to the sorting and counting machine. Like the cash box 22, the separator card 38 also includes a RF tag 40 embedded within it or mounted to its surface. In the example of FIG. 8, the separator card 38 (with the RF tag 40) is placed on an RF tag reader station 32, and a cash box 22 (with the RF tag 30) is placed over the separator card. The RF tag 40 embedded in or mounted to the separator card 38 can include a special identifier so that the RF tag reader recognizes the RF tag 40 as being associated with a separator card. Any data stored within the cash box memory is read by the RF tag reader station 32, which transfers the data to the RF tag 40 of the separator card 38 (block 158). The separator card 38 then is placed together with (e.g., on top of) the stack of notes removed from the cash box 22 (block 160). The separator card can be transported, together with the stack of notes, in a plastic bin sometimes referred to as a "chute." Multiple stacks of notes sometimes are placed atop one another in the chute. In that case, the separator cards also serve to separate one stack from the next. The notes and separator card 38 are transported to the note counting machine. Meanwhile, the empty cash box is ready for re-use (block 162).

Figure 9:
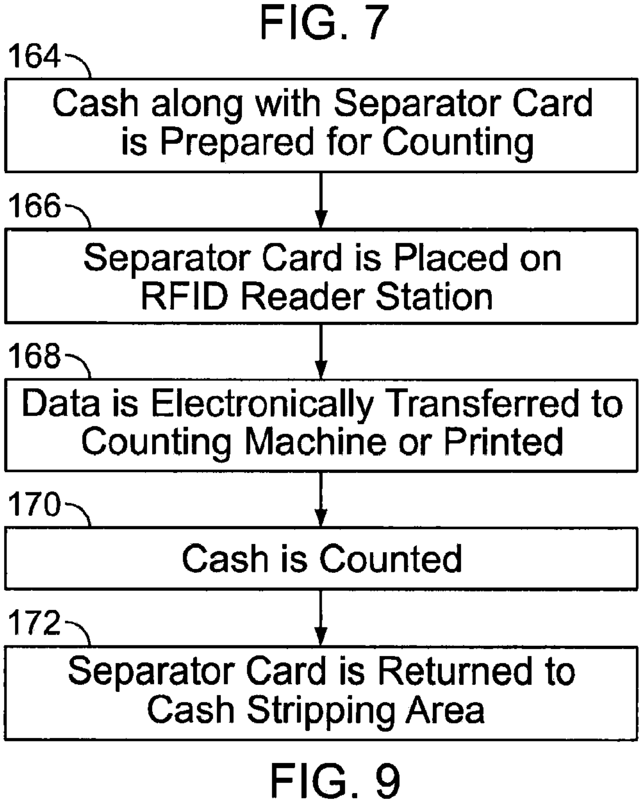
FIG. 9 is a flow chart.

As illustrated by FIG. 9, once the stack of notes and the associated separator card 38 are transported to the note counting machine (block 164), the separator card is placed onto another RF tag reader station near the note counting machine (block 166) so that the information stored in the RF tag 40 of the separator card is transferred electronically to the note counting machine or printed on a ticket (block 168). The stack of notes is fed into the counting machine, which counts the notes (block 170). In some cases, the counting machine also sorts the notes, for example, by denomination. The separator card 38 then can be returned, for subsequent re-use, to the location where the notes are removed from the cash box (block 172).

An issue that occasionally can arise when a note acceptor 20 is replaced or swapped, for example, with an empty note acceptor is that the location or asset number which is associated with the empty note acceptor may be incorrect for the new location (i.e., the gaming or vending machine in which the empty note acceptor is being installed). Thus, the location or asset number should be programmed to ensure the note acceptor contains the correct location or asset number.

Figure 10A:
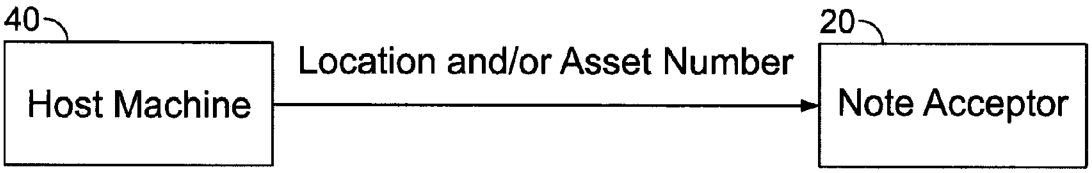
FIGS. 10A and 10B illustrate examples of communications between a host machine and a note acceptor.

One way of addressing the issue of location or asset number errors is to program the identification information (e.g., location or asset number) permanently into memory of the host machine 40 (e.g., gaming or vending machine). In some implementations, in addition to the exchange of any other messages that takes place between the host machine 40 and the note acceptor 20 (for example, upon power-up), a message is added to provide the identification information from the host machine to the note acceptor (see FIG. 10A). This message would inform the note acceptor 20 of the correct location or asset number.

Figure 10B:
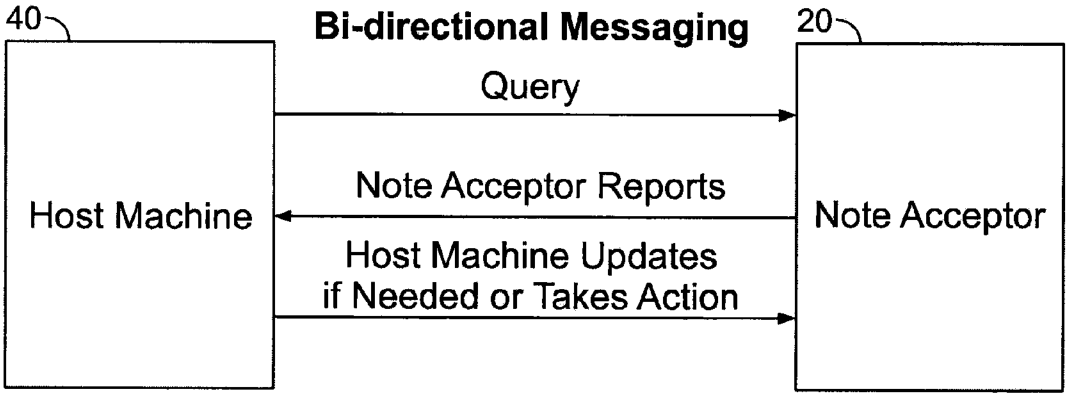

Alternatively, as shown in FIG. 10B, the host machine 40 can interrogate the note acceptor 20 for the location or asset number already stored in the note acceptor memory. The note acceptor 20 responds to the interrogation by sending to the host machine 40 the identification information currently stored in its memory. If the information is correct (i.e., it matches the identification information stored in the host machine), then the host machine 40 will continue to operate normally. If the information is incorrect (i.e., it does not match the identification information stored in the host machine), the host machine 40 can take corrective action, such as reporting an error. This can help ensure that a host gaming machine, for example, will not be operable for playing a game if the location or asset number stored in the note acceptor is incorrect. In some situations, in the event of a mismatch, the host machine updates the location or asset number in the note acceptor automatically.

Figure 11:
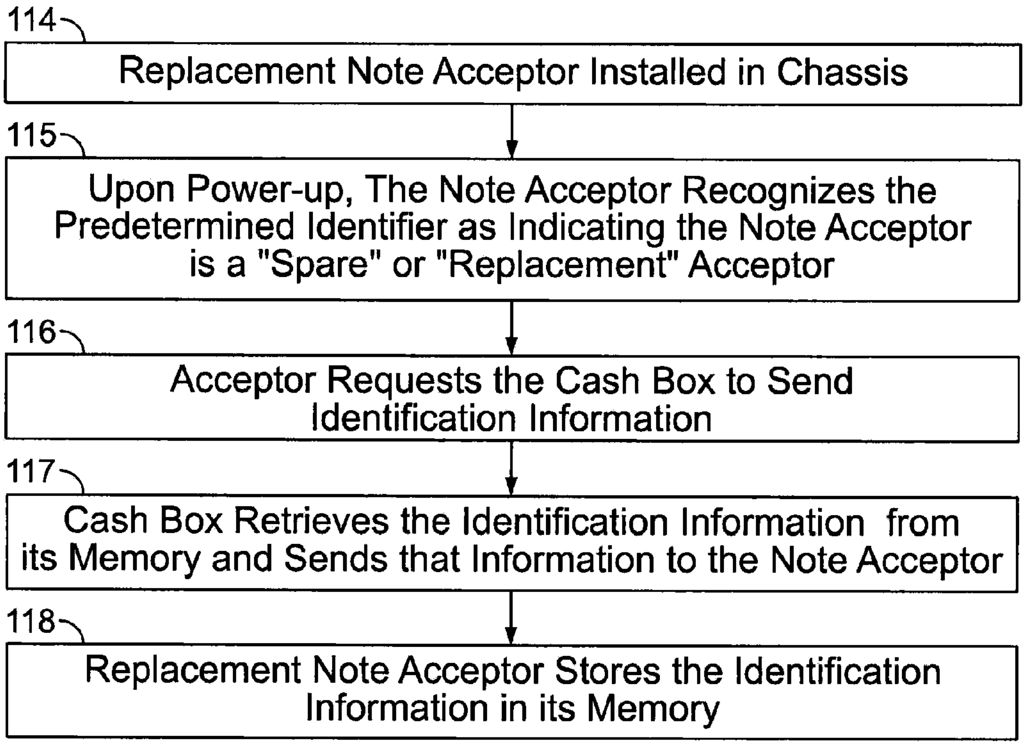
FIGS. 11, 12, 13 and 14 are flow charts.

In some implementations, the replacement note acceptor is configured with predetermined special identification information (e.g., asset number) in its memory that indicates the acceptor is a "spare" or "replacement" acceptor that is being used to replace the note acceptor currently coupled to the host machine. As indicated by FIG. 11, upon being powered up after the replacement acceptor is installed in the chassis (block 114), the acceptor's microprocessor recognizes the special identification information (block 115) and communicates with the cash box 22 already installed in the chassis. In particular, the replacement note acceptor requests the cash box 22 to send the asset number or other identification number stored in the cash box memory 31 to the note acceptor (block 116). In response, the RF tag chip 30 or other circuitry mounted to the cash box 22 retrieves the asset number or other identification information from its memory 31 and send that information to the note acceptor 20 (block 117). Upon receipt of the asset number or other identification information from the cash box 22, the replacement note acceptor stores that information in its own memory (block 118).

To facilitate testing of note acceptors during manufacturing, a "dummy" asset number can be stored in the note acceptor's memory. The "dummy" asset number is recognized by the note acceptor's microprocessor and allows the note acceptor to continue operating during testing even though there is no separate confirmation that the asset number in the note acceptor matches the identification information in a particular host machine or is otherwise correct.

As explained above, in a typical scenario such as may occur in a gaming facility, when a cash box 22 is filled to capacity (e.g., when it is filled with banknotes), the cash box is removed from the chassis 24 by service personnel, and an empty cash box is installed in its place. The removed cash box 22 is taken to a counting room and placed on the RF tag reading station 32. The currency or other notes in the cash box 22 are removed, and a bar coded ticket is printed with the information retrieved from the cash box memory 31 and other relevant data (e.g., time and date). When the data stored in the cash box 31 has been read and saved, the cash box memory 31 is marked electronically to indicate that the cash box 22 has been emptied (or is now empty). The cash box 22 then is ready to be reinstalled in a chassis 24 to receive notes from an acceptor 20 coupled to a host machine 40.

Figure 12:
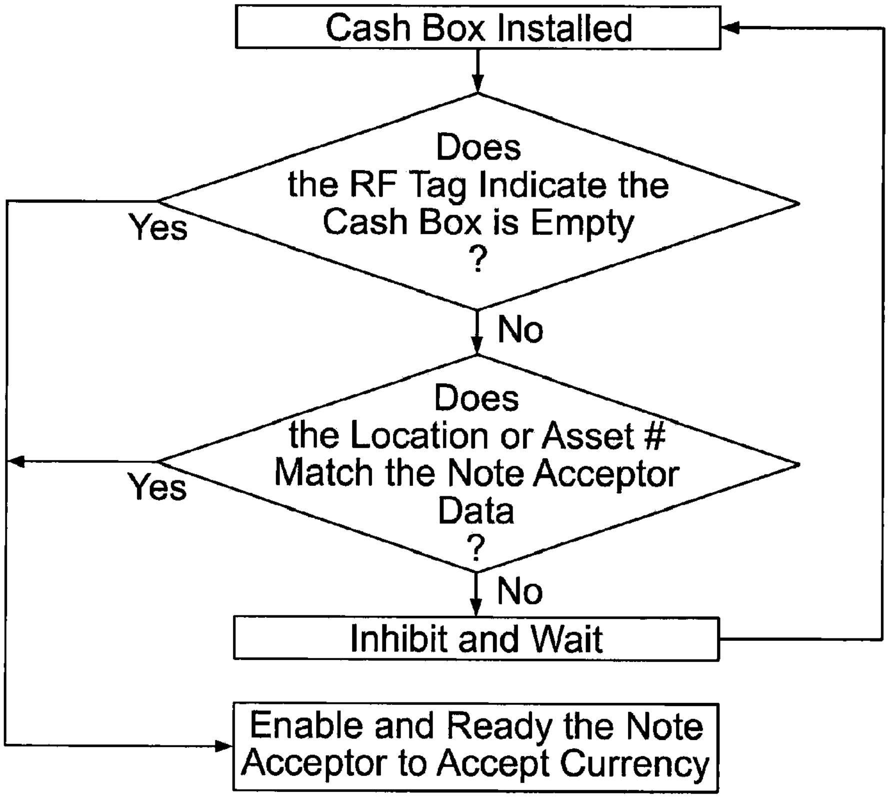

An accounting issue, however, can occur if the cash box being installed in the chassis is not, in fact, empty. As illustrated by FIG. 12, when the cash box initially is installed in the chassis 24, the note acceptor can detect the status of the cash box by checking the contents of the cash box memory 31 in the RF tag chip 30 mounted to the cash box. The note acceptor 22 can check the contents of the cash box memory 31 by requesting the cash box to send information indicative of whether the cash box is empty as well as identification information. If the information stored in the cash box memory 31 indicates the cash box has been emptied or if the RF tag has the expected location or asset number stored therein, the note acceptor 20 will operate normally (i.e., the note acceptor is enabled to receive notes, to check their authenticity and denomination, and to store them in the cash box). If, on the other hand, the information stored in the cash box memory 31 indicates that the cash box in not empty, and the location or asset number stored in the cash box memory 31 is not the expected one (i.e., does not match the identification information stored in the note acceptor memory), then the note acceptor 20 automatically is inhibited from accepting additional notes and, in some implementations, is operable to report automatically to a central system controller that an error has occurred.

Figure 13:
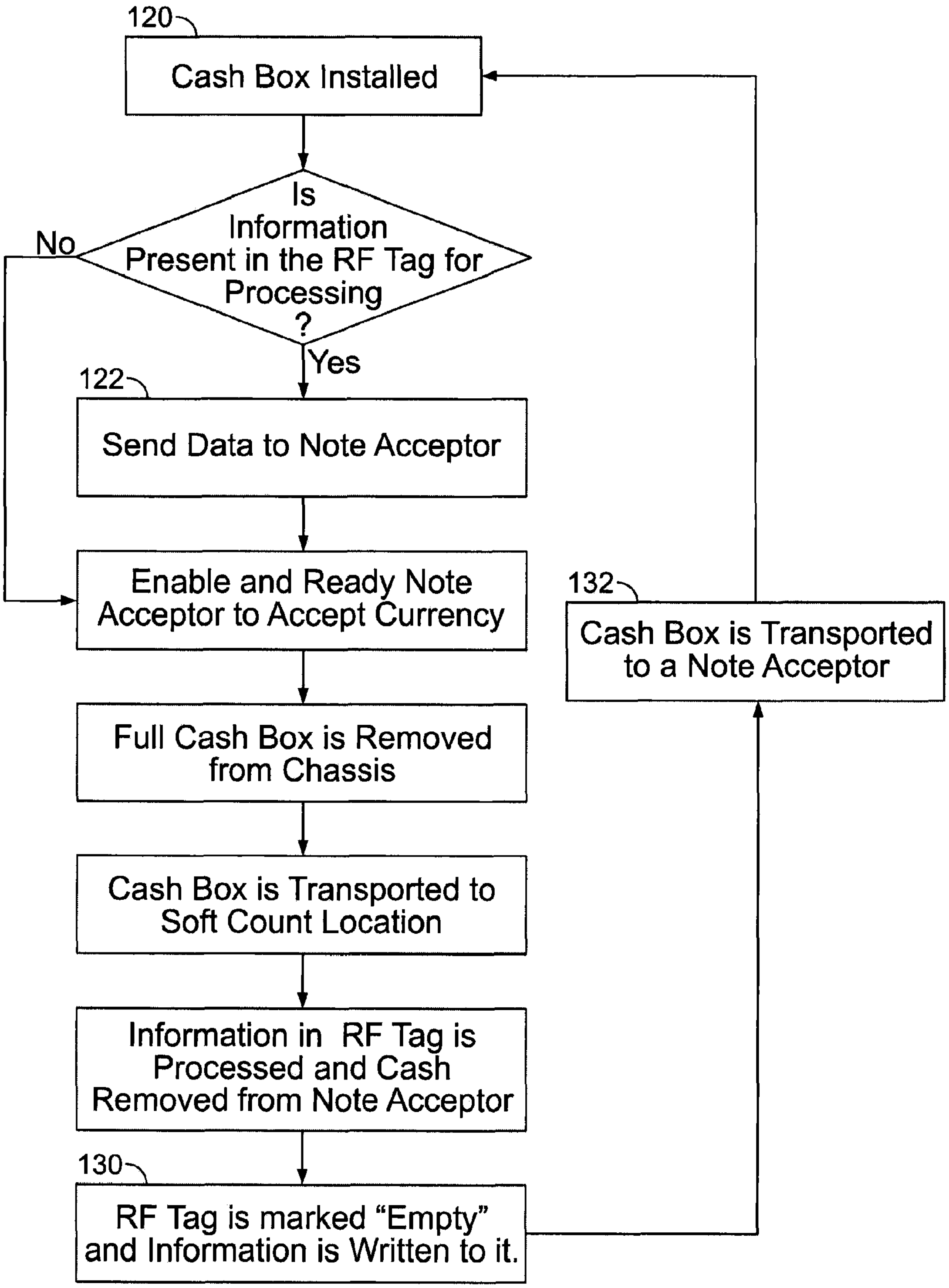

The cash box system also can be used to deliver information to a note acceptor unit 20 in the field or, for example, on the gaming facility floor. To change or update functionality of a note acceptor, service personnel typically must change a setting or update firmware or software. The cash box memory allows such updating to be done automatically by taking advantage of the fact that the cash boxes 22 are removed from and replaced in the host machines on a regular or periodic basis. Once the cash box 22 is emptied of its contents or the cash box memory 31 is electronically marked to indicate the cash box is "empty," new information can be written to and stored in the cash box memory, as indicated by block 130 of FIG. 13. When the cash box 22 is transported to and installed in the note acceptor 20 (blocks 132, 120), the newly stored information in the RF tag 30 is transferred to and stored in the note acceptor's memory (block 122). The transferred information can include, for example, configuration data such as an identification of the type of notes to be accepted or rejected, operating modes, or any other required settings. The foregoing techniques also can facilitate updating of the note acceptor's firmware or software.

Figure 14:
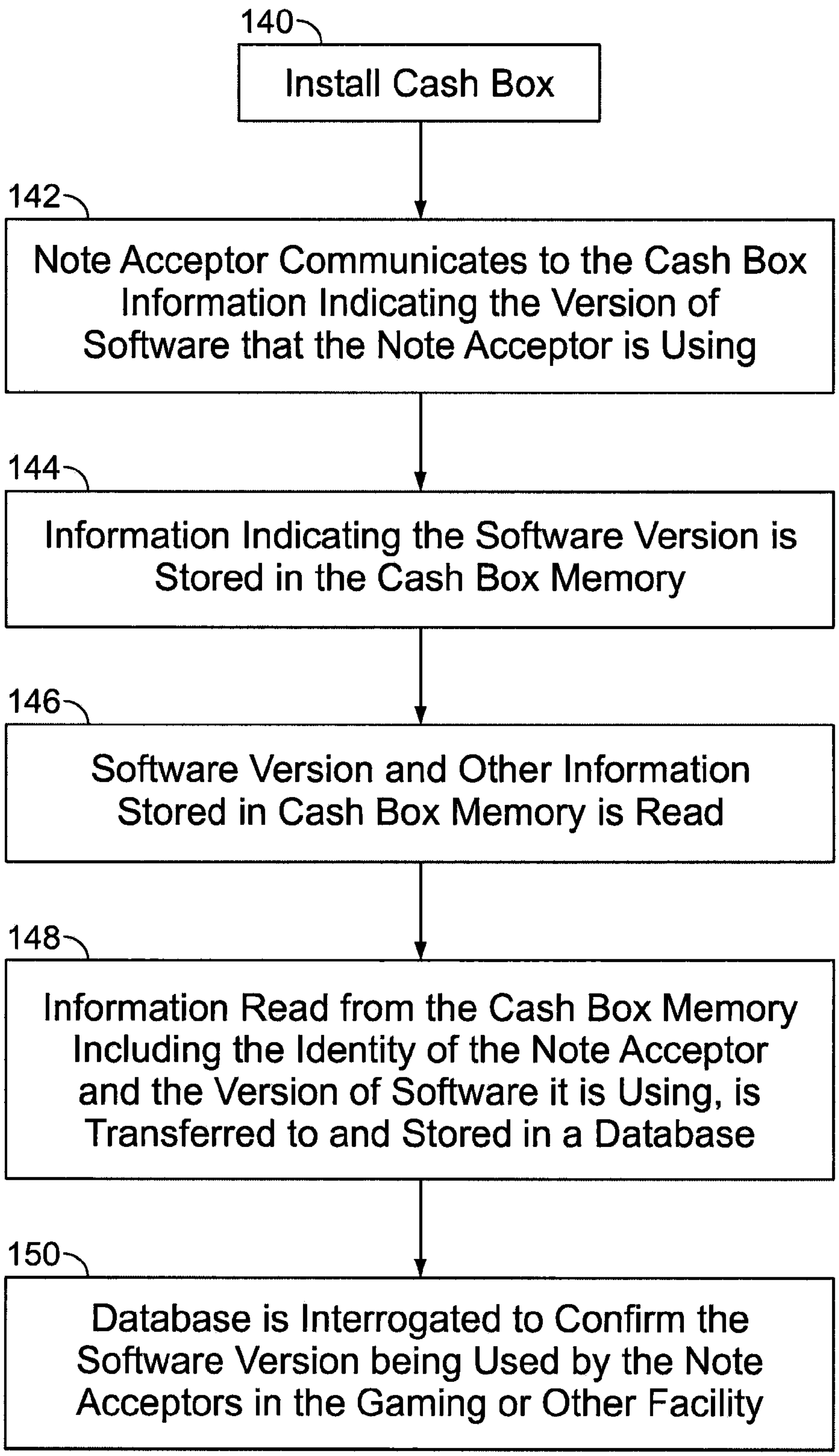

The cash box memory 31 also can be used to track the software version with which a particular note acceptor 20 is configured. For example, as indicated by FIG. 14, when the cash box 22 is installed in the chassis 24 (block 140), the note acceptor 20 communicates to the cash box information indicating the version of software that the note acceptor is using (block 142). The information indicating the software version is stored in the cash box memory 31 (block 144), from where it subsequently can be read, for example, by the RF tag reader when the cash box is brought to the soft count room (block 146). The information read from the cash box memory 31, including the identity of the note acceptor 22 and the version of software it is using, is transferred to and stored in a database (block 148). The database then can be interrogated to confirm the software version being used by the note acceptor in the gaming or other facility matches the expected version (block 150). This can facilitate management's confirming that all units in the gaming facility have been updated with the proper software, which can be important in avoiding violations of applicable regulatory rules.

Other implementations are within the scope of the claims.

What is claimed is:

1. A method of processing a cassette for storing notes, the method comprising:

removing the cassette from a first location where it is coupled to a note acceptor that is coupled to a host machine;

resting the cassette on a RF tag reader station located in a second location different from the first location;

using a RF tag reader to read contents of a RF tag chip mounted to the cassette while the cassette is on the RF tag reader station;

opening the cassette and removing notes from the cassette while the cassette is on the RF tag reader station; and using the RF tag reader to mark the RF tag chip electronically with an indication that the cassette has been emptied of notes.

2. The method of claim 1 including printing a copy of the contents read from the RF tag chip.

3. A method for processing information in a first RF tag chip mounted to a cassette for storing notes, the method comprising:

placing the cassette in the vicinity of a RF tag reader;

placing a separator card in the vicinity of the RF tag reader, wherein the separator card has a second RF tag chip embedded therein or mounted thereto;

transferring the information in the first RF tag chip to the second RF tag chip via the RF tag reader;

removing a first stack of notes from the cassette;

transporting the separator card together with the first stack of notes after transferring the information to the second RF tag chip, wherein the separator card separates the first stack of notes from a second stack of notes;

subsequently feeding the first stack of notes into a note counting machine; and transferring the information from the second RF tag chip to the note counting machine.

4. The method of claim 3 wherein, prior to placing the cassette in the vicinity of the RF tag reader, the cassette is detached from a host machine where the cassette stores notes received from a note acceptor and where the first RF tag chip mounted to the cassette stores information received from the note acceptor.

5. The method of claim 4 wherein the host machine is a gaming machine.

6. The method of claim 3 wherein the second RF tag chip stores information that allows the RF tag reader to recognize the second RF tag chip as being associated with a separator card.

* * * * *